(12) United States Patent
Chen et al.

(10) Patent No.: US 9,331,575 B2
(45) Date of Patent: May 3, 2016

(54) PHASE ADJUSTMENT CIRCUIT OF POWER CONVERTER, POWER CONVERTER, AND CONTROL METHOD THEREOF

(71) Applicant: uPI Semiconductor Corp., Hsinchu County (TW)

(72) Inventors: Ya-Ping Chen, Hsinchu County (TW); Hung-Hsuan Cheng, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 29 days.

(21) Appl. No.: 14/265,372

(22) Filed: Apr. 30, 2014

(65) Prior Publication Data

US 2015/0022171 A1 Jan. 22, 2015

(30) Foreign Application Priority Data

Jul. 22, 2013 (TW) .............................. 102126135 A

(51) Int. Cl.
*H02M 3/158* (2006.01)
*H02M 1/00* (2006.01)

(52) U.S. Cl.
CPC ............ *H02M 3/158* (2013.01); *H02M 3/1588* (2013.01); *H02M 2001/0025* (2013.01); *Y02B 70/1466* (2013.01)

(58) Field of Classification Search
CPC .............. H02M 3/158; H02M 3/1588; H02M 2001/0025
USPC ................................. 323/271, 282, 285, 288
See application file for complete search history.

(56) References Cited

U.S. PATENT DOCUMENTS

| 3,697,871 | A | * | 10/1972 | MacMullan | ........... G01R 17/02 318/666 |
| 7,619,395 | B2 | | 11/2009 | Mok et al. | |
| 7,863,875 | B1 | | 1/2011 | Guo et al. | |
| 7,868,600 | B2 | | 1/2011 | Qiu et al. | |
| 8,742,745 | B2 | * | 6/2014 | Huang | ................. H02M 3/156 323/285 |

(Continued)

FOREIGN PATENT DOCUMENTS

| TW | 201032453 | 9/2010 |
| TW | M414763 | 10/2011 |
| TW | I354433 | 12/2011 |

OTHER PUBLICATIONS

"DC-DC Controllers Use Average-Current-Mode Control for Infotainment Applications," Maxim Integrated Products, Inc., http://www.maximintegrated.com/en/app-notes/index.mvp/id/3939, Nov. 22, 2006.

(Continued)

*Primary Examiner* — Jue Zhang
*Assistant Examiner* — Lakaisha Jackson
(74) *Attorney, Agent, or Firm* — Jianq Chyun IP Office

(57) ABSTRACT

A phase adjustment circuit of a power converter, the power converter, and a control method of the power converter are provided. The control method includes following steps. A delay signal is generated according to an error signal, and the error signal is associated with an output voltage of the power converter. A difference between the error signal and the delay signal is amplified. A control signal is provided according to the amplified difference and the error signal, and a phase of the control signal leads a phase of the error signal. The control signal serves to improve a response speed of the power converter.

11 Claims, 5 Drawing Sheets

(56) References Cited

U.S. PATENT DOCUMENTS

| | | |
|---|---|---|
| 2010/0072964 A1 | 3/2010 | Qiu et al. |
| 2011/0273156 A1* | 11/2011 | Miyamae .............. H02M 3/156 323/288 |
| 2013/0162230 A1* | 6/2013 | Miyamae .................. G05F 1/46 323/271 |
| 2013/0200864 A1* | 8/2013 | Huang .................. H02M 3/156 323/271 |
| 2014/0292299 A1* | 10/2014 | Yang ................... H02M 3/1588 323/288 |

OTHER PUBLICATIONS

"Office Action of Taiwan Counterpart Application," issued on Feb. 9, 2015, p. 1-p. 7.

* cited by examiner

PHASE ADJUSTMENT CIRCUIT OF POWER CONVERTER, POWER CONVERTER, AND CONTROL METHOD THEREOF

CROSS-REFERENCE TO RELATED APPLICATION

This application claims the priority benefit of Taiwan application serial no. 102126135, filed on Jul. 22, 2013. The entirety of the above-mentioned patent application is hereby incorporated by reference herein and made a part of this specification.

BACKGROUND OF THE INVENTION

1. Field of the Invention

The invention relates to a power converter. In particular, the invention relates to a phase adjustment circuit of a power converter, the power converter, and a control method of the power converter.

2. Description of Related Art

FIG. 1 is a schematic diagram illustrating a conventional power converter. FIG. 2 is a schematic diagram illustrating waveforms in a conventional power converter. Please refer to both FIG. 1 and FIG. 2. The existing power converter 100 is often designed in a circuit structure featuring a constant on time (COT) control architecture. A comparator 110 of the power converter 100 generates a comparison signal Xcm by comparing an error signal Xerr with a ramp signal Xramp. A timing controller circuit 120 generates a pulse width modulation (PWM) signal Xpwm according to the comparison signal Xcm, an input voltage Vin, and an output voltage Vout. Here, the width of the on time Ton of the PWM signal Xpwm is fixed in each cycle, and the width of the on time Ton (as shown in FIG. 2) is associated with the input voltage Vin and the output voltage Vout.

In the power converter 100, the comparison signal Xcm is generated according to the error signal Xerr and the ramp signal Xramp, and the time point at which the on time Ton of the PWM signal Xpwm is output is determined according to the comparison signal Xcm. The value of the error signal Xerr is associated with both a feedback signal Vfb and a reference voltage Vref. When it is determined to output the on time Ton of the PWM signal Xpwm, the timing controller circuit 120 starts to calculate to obtain the on time Ton, and the on time Ton of the PWM signal Xpwm is fixed in each cycle.

The conventional PWM operation may ensure the fixed frequency. However, if an equivalent serial resistance DCR of an inductor L and an equivalent serial resistance ESR of a capacitor CL at an output terminal of the power converter 100 are rather small, the energy compensated by the capacitor CL and the inductor L in response to the transient variation of the load is delayed, and therefore the feedback signal Vfb and the error signal Xerr are also delayed. The error signal Xerr originally generated by a compensation circuit 130 can no longer be applied to converge the output voltage Vout, and hence the waveforms of the output voltage Vout oscillate in a noticeable manner.

SUMMARY OF THE INVENTION

Accordingly, the invention is directed to a phase adjustment circuit of a power converter, the power converter, and a control method of the power converter, which resolves the problem exemplarily mentioned in the related art.

In an embodiment of the invention, a phase adjustment circuit of a power converter is provided. The phase adjustment circuit generates a delay signal according to an error signal and amplifies a difference between the error signal and the delay signal to provide a control signal according to the amplified difference and the error signal. The error signal is associated with an output voltage of the power converter.

According to an embodiment of the invention, the phase adjustment circuit includes a first amplifier, a first resistor, a first capacitor, and a voltage control voltage source (VCVS). A first input terminal of the first amplifier receives the error signal. A first terminal of the first resistor is coupled to a second input terminal and an output terminal of the first amplifier. The first capacitor is coupled between a second terminal of the first resistor and a ground terminal. A first input terminal of the VCVS is coupled to the first terminal of the first resistor. A second input terminal of the VCVS is coupled to the second terminal of the first resistor. A first output terminal of the VCVS outputs the control signal. A second output terminal of the VCVS is coupled to the first input terminal of the first amplifier.

According to an embodiment of the invention, the phase adjustment circuit includes a second amplifier, a second resistor, and a second capacitor. A first input terminal of the second amplifier receives the error signal. An output terminal of the second amplifier outputs the control signal. The second resistor is coupled between a second input terminal and the output terminal of the second amplifier. The second capacitor is coupled between the second input terminal of the second amplifier and a ground terminal.

According to an embodiment of the invention, the phase adjustment circuit further includes a current source, a first current mirror, a first p-type metal oxide semiconductor transistor, a third capacitor, a first n-type metal oxide semiconductor transistor, a third resistor, and a second current mirror. The first current mirror is coupled between an operating voltage and the current source. A source of the first p-type metal oxide semiconductor transistor is coupled to the first mirror. A gate of the first p-type metal oxide semiconductor transistor receives the error signal. A first terminal of the third capacitor is coupled to the operating voltage. A second terminal of the third capacitor is coupled to the source of the first p-type metal oxide semiconductor transistor. A gate of the first n-type metal oxide semiconductor transistor is coupled to the gate of the first p-type metal oxide semiconductor transistor. A first terminal of the third resistor is coupled to the source of the first n-type metal oxide semiconductor transistor. The second current mirror is coupled to a drain of the first p-type metal oxide semiconductor transistor, a second terminal of the third resistor, and a ground terminal. The control signal is generated at a region where the second current mirror and the third resistor are coupled to each other.

According to an embodiment of the invention, a phase of the control signal leads a phase of the error signal.

In an embodiment of the invention, a power converter is provided. The power converter includes a first amplifier, a phase adjustment circuit, a comparator, and a control circuit. A first input terminal of the first amplifier receives the error signal. A second input terminal of the first amplifier receives the feedback signal. The feedback signal is associated with an output voltage of the power converter. An output terminal of the first amplifier outputs the error signal. The phase adjustment circuit is coupled to the first amplifier. Besides, the phase adjustment circuit generates a delay signal according to the error signal and amplifies a difference between the error signal and the delay signal to provide a control signal according to the amplified difference and the error signal. A first input terminal of the comparator receives the control signal. A second input terminal of the comparator receives a ramp signal. An output terminal of the comparator outputs a comparison signal. The control circuit generates a pulse width modulation (PWM) signal according to the comparison signal, so as to control the power converter.

In an embodiment of the invention, a control method of a power converter includes following steps. A delay signal is generated according to an error signal, and the error signal is associated with an output voltage of the power converter. A difference between the error signal and the delay signal is amplified. According to the amplified difference and the error signal, a control signal is provided.

As is discussed above, in the power converter, the phase adjustment circuit of the power converter, and the control method of the power converter, the error signal is converted into a new control signal through the phase-lead mechanism, and the control signal replaces the error signal. During the loop control, the control signal may contribute to phase compensation; hence, the output voltage of the power converter may be converged in a rapid manner, and the transient response is rather stable.

Note that the above descriptions and the below embodiments are exemplary and illustrative and should not serve to limit the protection scope of the invention.

Several exemplary embodiments accompanied with figures are described in detail below to further describe the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
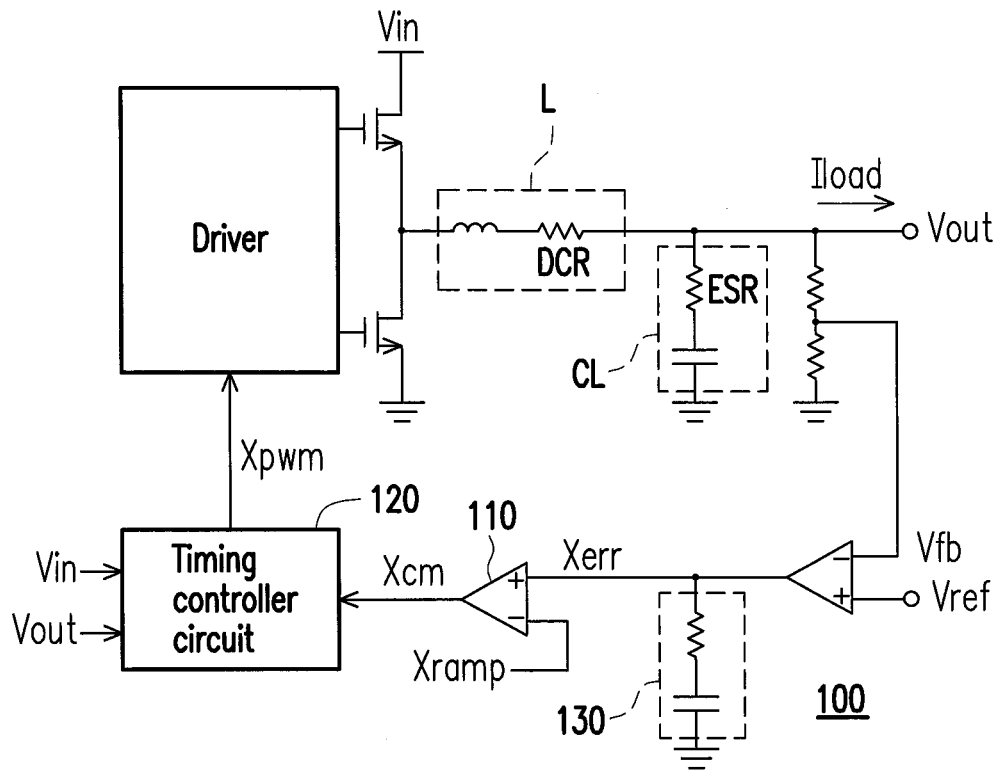
FIG. 1 is a schematic diagram illustrating a conventional power converter.
Figure 2:
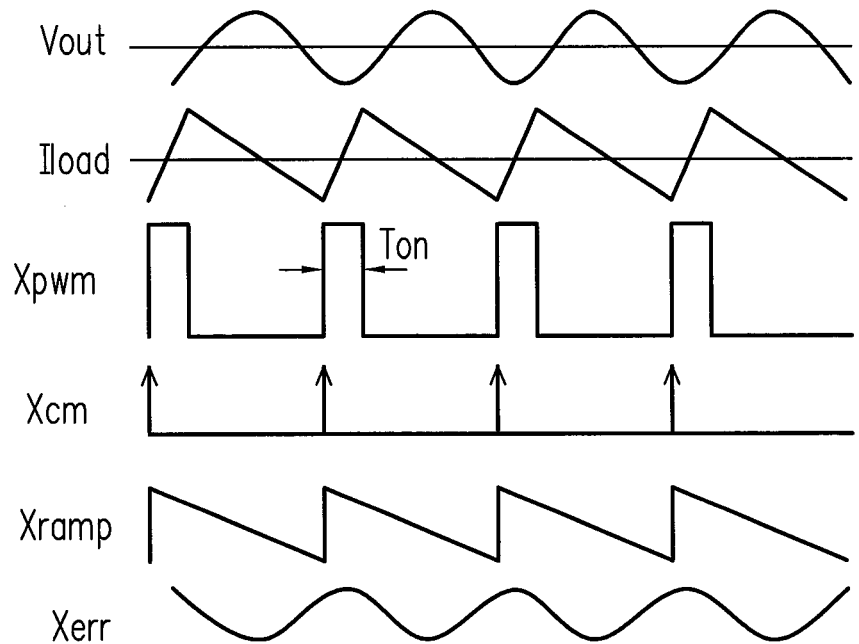
FIG. 2 is a schematic diagram illustrating waveforms in a conventional power converter.

Descriptions of the invention are given with reference to the exemplary embodiments illustrated with accompanied drawings, wherein same or similar parts are denoted with same or similar reference numerals.

In the following embodiments, when one device is "connected to" or "coupled to" another device, the device may be directly connected to or coupled to another device; alternatively, there may be a device between the two connected or coupled devices. The term "circuit" or "unit" may represent one or plural devices; these devices may be actively and/or passively coupled to each other or one another to perform proper functions. The term "signal" may refer to at least one current, voltage, load, temperature, data, or any other signal.

Figure 3:
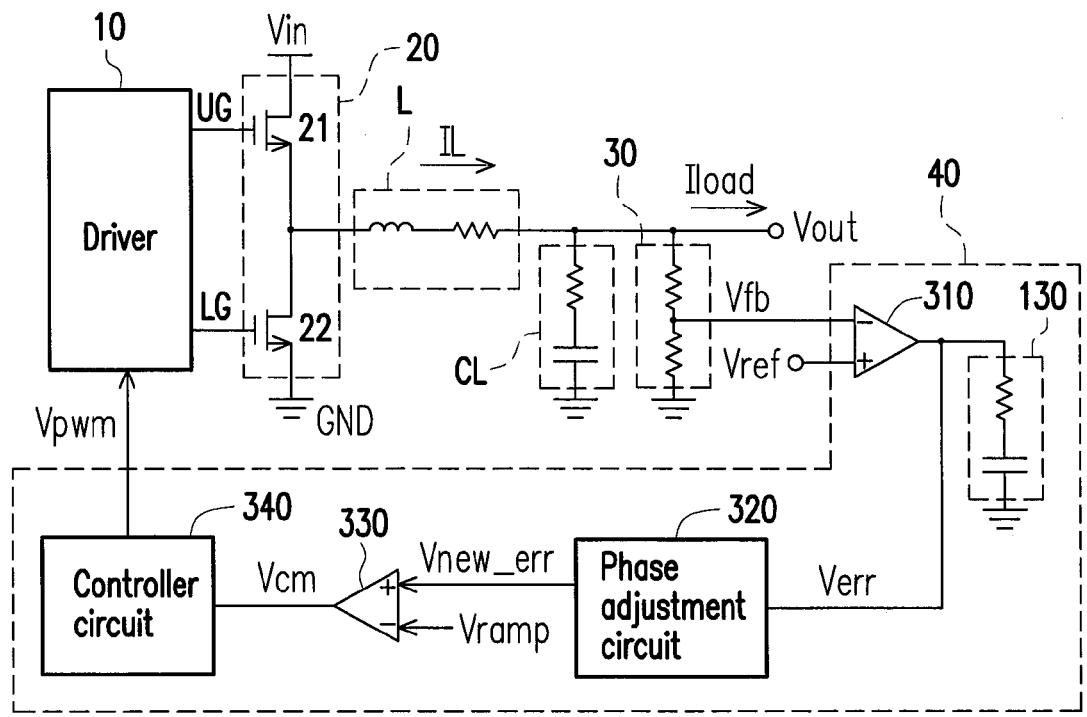
FIG. 3 is a schematic diagram illustrating the structure of a power converter according to an embodiment of the invention.

FIG. 3 is a schematic diagram illustrating the structure of a power converter according to an embodiment of the invention. Please refer to FIG. 3. The power converter 300 includes a driver 10, an output stage 20, an inductor L, a capacitor CL, a feedback circuit 30, and a feedback control circuit 40. A first terminal of a high side switch 21 in the output stage 20 receives an input voltage Vin. A low side switch 22 is coupled between a second terminal of the high side switch 21 and a ground terminal GND.

In an embodiment of the invention, the feedback control circuit 40 and the driver 10 may together construct a DC-DC controller; while the DC-DC controller is applied in an integrated circuit (IC), a compensation circuit 130 in the feedback control circuit 40 may be configured outside the IC. In another embodiment, the feedback control circuit 40 may construct a DC-DC controller and is applied in a single IC. Additionally, the feedback control circuit 40, the driver 10, and the output stage 20 may together construct a DC-DC converter; while the DC-DC converter is applied in an IC, the compensation circuit 130 in the feedback control circuit 40 may be configured outside the IC.

The feedback control circuit 40 includes an amplifier 310, a phase adjustment circuit 320, a comparator 330, and a control circuit 340. The feedback control circuit 40 may further include a compensation circuit 130. A first input terminal of the amplifier 310 receives a reference voltage Vref. A second input terminal of the amplifier 310 receives a feedback signal Vfb. The feedback signal Vfb is associated with an output voltage Vout of the power converter 300. In another embodiment of the invention, the feedback signal Vfb may also be the output voltage Vout. An output terminal of the amplifier 310 outputs an error signal Verr. The phase adjustment circuit 320 is coupled to the amplifier 310 and provides a control signal Vnew_err according to the error signal Verr. A first input terminal of the comparator 330 receives the control signal Vnew_err. A second input terminal of the comparator 330 receives a ramp signal Vramp. An output terminal of the comparator 330 outputs a comparison signal Vcm. The control circuit 340 generates a pulse width modulation (PWM) signal Vpwm according to the comparison signal Vcm, so as to control the power converter 300. In an embodiment of the invention, the PWM signal Vpwm may be a constant-on-time (COT) signal. However, in another embodiment of the invention, the PWM signal Vpwm may be of another type, which should not be construed as a limitation to the invention.

Note that a phase of the control signal Vnew_err leads a phase of the error signal Verr.

According to the PWM signal Vpwm, the driver 10 generates a high side switch control signal UG and a low side switch control signal LG, so as to respectively control the high side switch 21 and the low side switch 22. The output stage 20 serves to perform a DC-DC conversion on the input voltage Vin, and thereby the power converter 300 may generate the output voltage Vout and output the output voltage Vout to a load.

In an embodiment of the invention, the phase adjustment circuit may be referred to as a delay processing circuit for performing delay processing on the error signal Verr. The delayed error signal is then added to the original error signal Verr to generate the new error signal Vnew_err (i.e., the control signal Vnew_err).

Figure 4:
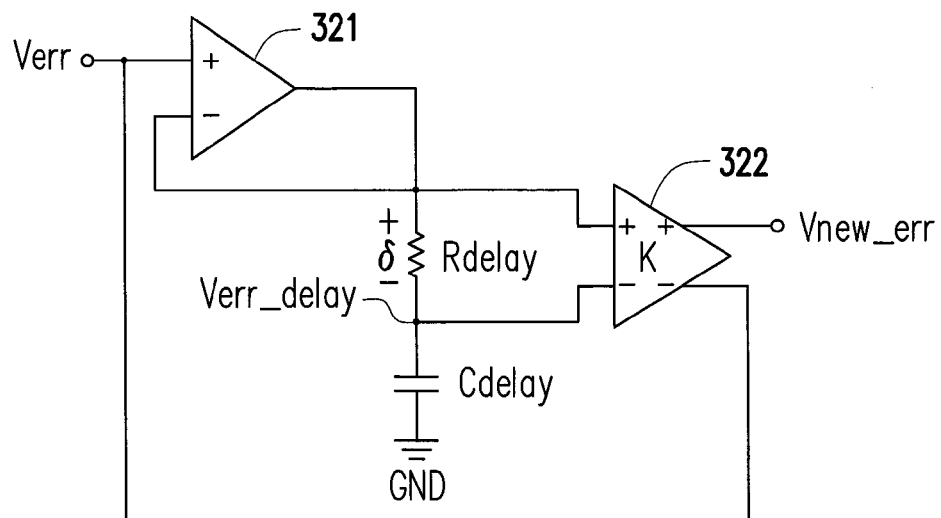
FIG. 4 is a schematic diagram illustrating a phase adjustment circuit according to a first embodiment of the invention.

FIG. 4 is a schematic diagram illustrating a phase adjustment circuit according to a first embodiment of the invention. Please refer to FIG. 4. The phase adjustment circuit 320A described herein may be applied to the power converter 300 shown in FIG. 3. The phase adjustment circuit 320A includes an amplifier 321, a resistor Rdelay, a capacitor Cdelay, and a voltage control voltage source (VCVS) 322.

A first input terminal of the amplifier 321 receives the error signal Verr. The error signal Verr is associated with the output voltage Vout of the power converter 300.

A first terminal of the resistor Rdelay is coupled to a second input terminal and an output terminal of the amplifier 321. The capacitor Cdelay is coupled between a second terminal of the resistor Rdelay and the ground terminal GND. A first input terminal of the VCVS 322 is coupled to the first terminal of the resistor Rdelay. A second input terminal of the VCVS 322 is coupled to the second terminal of the resistor Rdelay. A first output terminal of the VCVS 322 outputs the control signal Vnew_err. A second output terminal of the VCVS 322 is coupled to the first input terminal of the amplifier 321.

The phase adjustment circuit 320A generates a delay signal Verr_delay according to the error signal Verr and amplifies a difference δ between the error signal Verr and the delay signal Verr_delay through multiplying the difference δ by multiplying power K (K is greater than 1). If the multiplying power K ranges from 0 to 1, the difference δ may be reduced. According to the amplified difference (K*δ) and the error signal Verr, the phase adjustment circuit 320A provides the control signal Vnew_err. Note that the phase of the control signal Vnew_err leads the phase of the error signal Verr.

Figure 5:
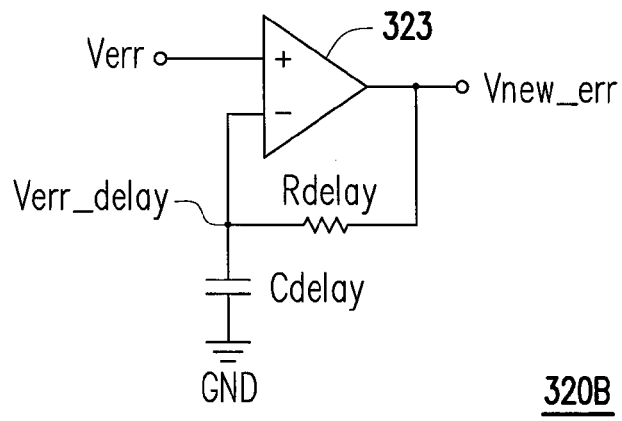
FIG. 5 is a schematic diagram illustrating a phase adjustment circuit according to a second embodiment of the invention.

FIG. 5 is a schematic diagram illustrating a phase adjustment circuit according to a second embodiment of the invention. Please refer to FIG. 5. The phase adjustment circuit 320B described herein may be applied to the power converter 300 shown in FIG. 3. The phase adjustment circuit 320B includes an amplifier 323, a resistor Rdelay, and a capacitor Cdelay. The resistor Rdelay is coupled between a second input terminal and an output terminal of the amplifier 323. The capacitor Cdelay is coupled between the second input terminal of the amplifier 323 and the ground terminal GND. A first input terminal of the amplifier 323 receives the error signal Verr. A delay signal Verr_delay is generated by delaying the error signal Verr.

If the multiplying power of the amplifier 323 is K, the voltage across the resistor Rdelay is K*δ, and δ=Verr−Verr_delay. The phase of the control signal Vnew_err generated by the output terminal of the amplifier 323 leads the phase of the error signal Verr. Besides, the amplifier 323 may be a transconductance amplifier.

Figure 9:
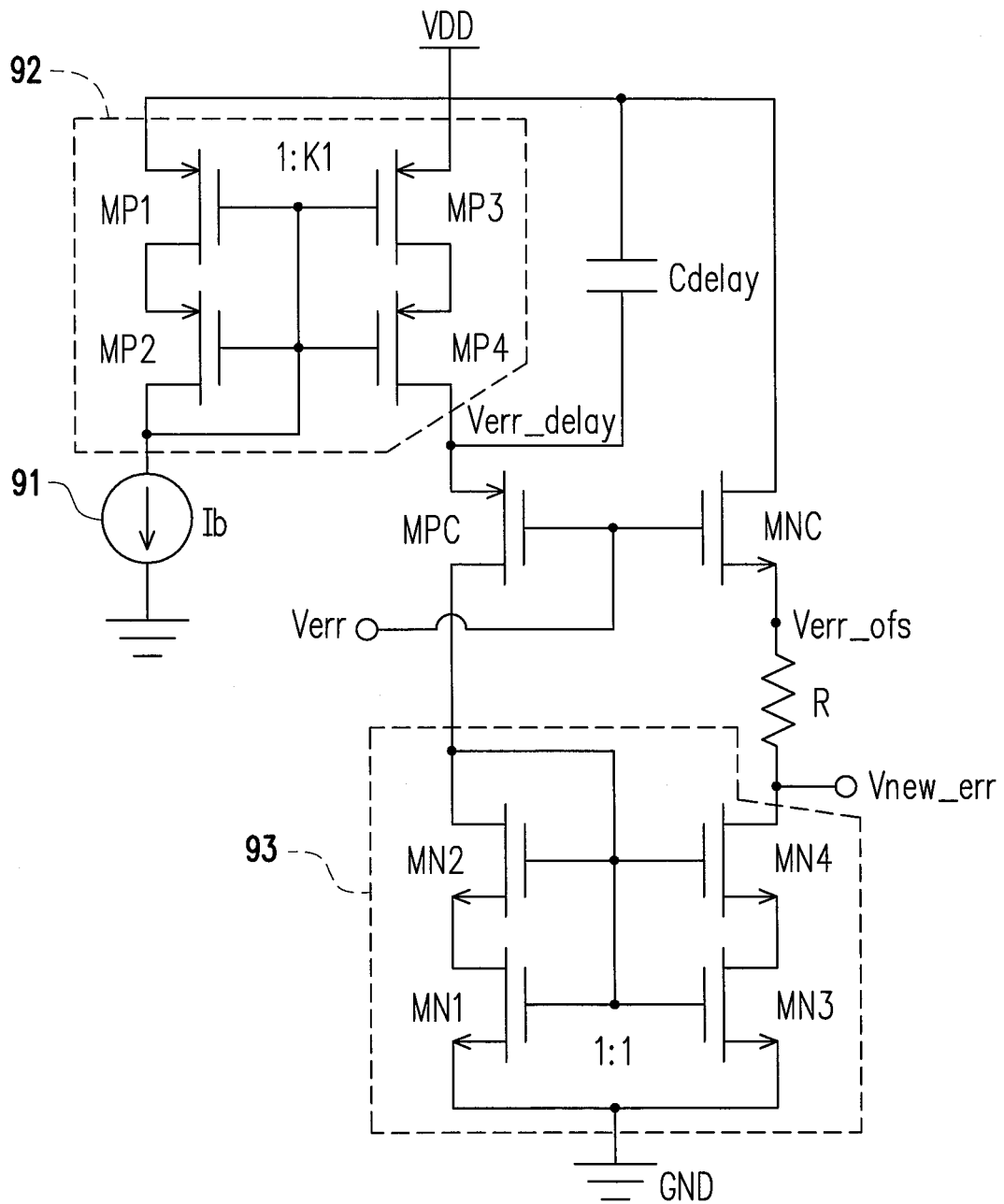
FIG. 9 is a schematic diagram illustrating a phase adjustment circuit according to a third embodiment of the invention.

FIG. 9 is a schematic diagram illustrating a phase adjustment circuit according to a third embodiment of the invention. Please refer to FIG. 9. The phase adjustment circuit 320C described herein may be applied to the power converter 300 shown in FIG. 3. The phase adjustment circuit 320C includes a current source 91, a current mirror 92, a p-type metal oxide semiconductor transistor (PMOS) MPC, a capacitor Cdelay, an n-type metal oxide semiconductor transistor (NMOS) MNC, a resistor R, and a current mirror 93. The current mirror 92 includes PMOSs MP1, MP2, MP3, and MP4. The current mirror 93 includes NMOSs MN1, MN2, MN3, and MN4.

The current mirror 92 is coupled between an operating voltage VDD and the current source 91. A source of the PMOS MPC is coupled to the current mirror 92. A gate of the PMOS MPC receives the error signal Verr. A first terminal of the capacitor Cdelay is coupled to the operating voltage VDD. A second terminal of the capacitor Cdelay is coupled to the source of the PMOS MPC. A gate of the NMOS MNC is coupled to the gate of the PMOS MPC. A first terminal of the resistor R is coupled to the source of the NMOS MNC. The current mirror 93 is coupled to a drain of the PMOS MPC, a second terminal of the resistor R, and the ground terminal GND. The control signal Vnew_err is generated at a region where the current mirror 93 and the resistor R are coupled to each other.

The operational principle of the phase adjustment circuit 320C is described below. The current mirror 92 mirrors a constant current Ib to the source of the PMOS MPC. The mirrored current is obtained by multiplying the constant current Ib by multiplying power K1. The error signal Verr is delayed by the capacitor Cdelay to generate the delay signal Verr_delay. The capacitor Cdelay is able to adjust a small signal delay ratio of the error signal Verr.

The error signal Verr is converted into a shift signal Verr_ofs through the NMOS MNC with a source-follow configuration. The shift signal Verr_ofs is in phase with the error signal Verr. The current mirror 93 mirrors a current (that flows through the PMOS MPC) to the source of the NMOS MNC. The difference δ (δ=Verr−Verr_delay) is converted into current information by the PMOS MPC. The current information is converted into voltage information by the current mirror 93 after the current flowing through the resistor R, and the current information is added to the shift signal Verr_ofs, so as to obtain the new control signal Vnew_err. Note that the phase of the control signal Vnew_err leads the phase of the error signal Verr.

Figure 6:
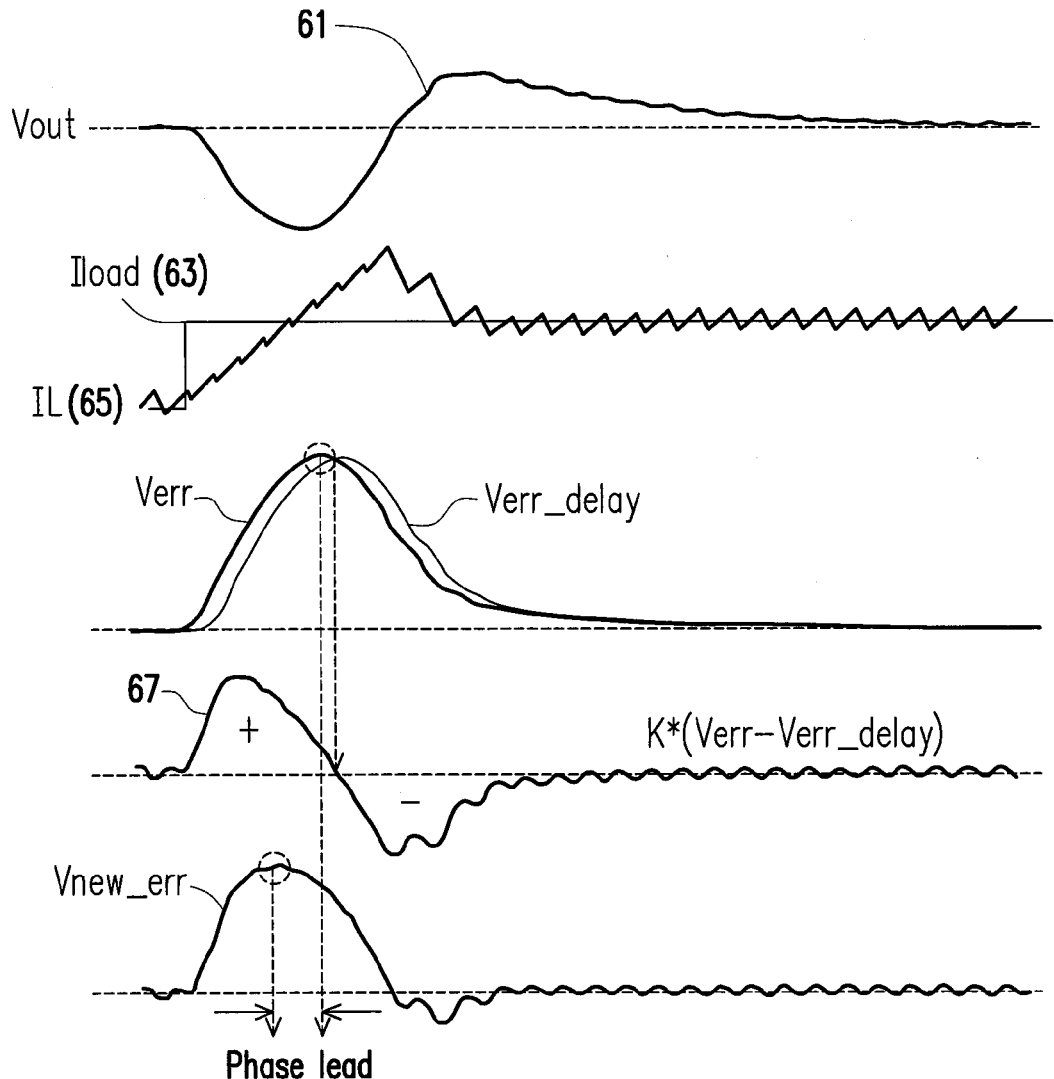
FIG. 6 illustrates an analysis result of waveforms in a power converter according to an embodiment of the invention.

FIG. 6 illustrates an analysis result of waveforms in the power converter according to an embodiment of the invention. Please refer to FIG. 3, FIG. 4, and FIG. 6 together, and the following descriptions are given with reference to the embodiment shown in FIG. 4.

The waveform 63 represents a load current Iload. The waveform 65 represents an inductor current IL on the inductor L. When the load current Iload is determined (the waveform 63), the waveform 61 of the output voltage Vout falls. With the energy variation in the inductor current IL, the waveform 61 oscillates and then reaches a constant value.

In the present embodiment, the power converter 300 calculates the difference (i.e., the voltage difference) δ by means of the error signal Verr and the delayed error signal Verr_delay, and δ=Verr−Verr_delay. The difference δ is amplified by multiplying the difference δ by the multiplying power K, for instance, and K is greater than 1. The amplified difference is K*(Verr−Verr_delay), as shown by the waveform 67. In FIG. 6, if the waveform 67 is located above the horizontal line, the positive sign (+) is employed to represent that the energy is greater than the load current Iload. By contrast, if the waveform 67 is located below the horizontal line, the negative sign (−) is employed to represent that the energy is less than the load current Iload.

The waveform 67 and the original error signal Verr are added to generate the new control signal Vnew_err. Apparently, the phase of the control signal Vnew_err leads the phase of the original error signal Verr, and thus the output voltage Vout of the power converter 300 may be converted in an expedited manner, the transient response speed may be improved, and the stability is further enhanced according to the present embodiment in comparison with the related art.

Figure 7:
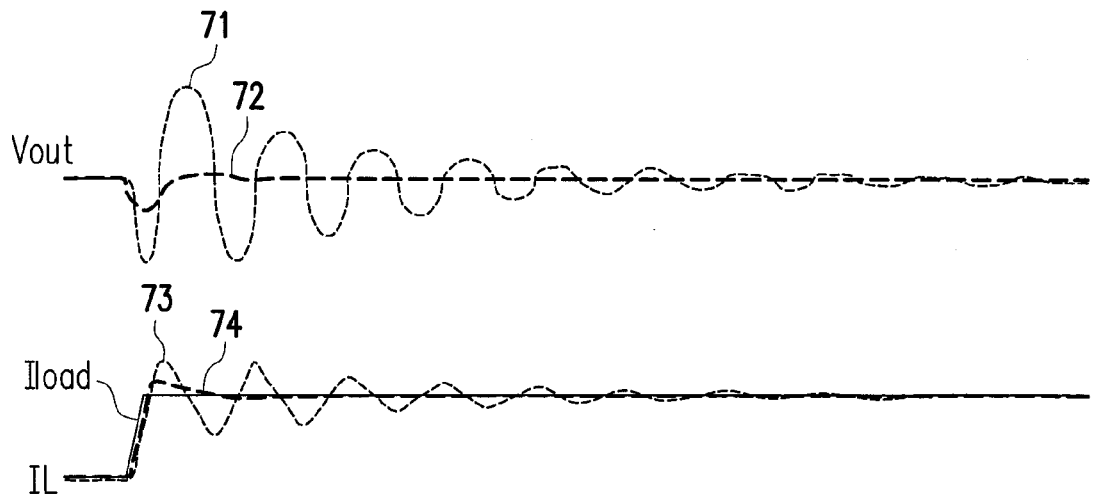
FIG. 7 illustrates a comparison result between waveforms in a power converter and waveforms in a conventional power converter according to an embodiment of the invention.

FIG. 7 illustrates a comparison result between waveforms in a power converter and waveforms in a conventional power converter according to an embodiment of the invention. Please refer to FIG. 1, FIG. 3, and FIG. 7 together. According to the related art, the way to control the PWM operation is determined according to the error signal Xerr and the ramp signal Xramp, and the waveforms 71 and 73 respectively represent the output voltage Vout and the inductor current IL. By contrast, the power converter 300 described herein determines the way to control the PWM operation according to the control signal Vnew_err and the ramp signal Vramp, and the waveforms 72 and 74 respectively represent the output voltage Vout and the inductor current IL.

After the waveform of the output voltage Vout in the power converter 300 is compared with that in the conventional power converter, it is apparent that the oscillation amplitude of the waveform 72 is smaller than that of the waveform 71. Besides, after the waveform of the inductor current IL in the power converter 300 is compared with that in the conventional power converter, it is apparent that the oscillation amplitude of the waveform 74 is smaller than that of the waveform 73. Since the control signal Vnew_err of the power converter 300 may contribute to loop phase compensation. Hence, during the loop control, the output voltage Vout of the power converter 300 may be converged in a rapid manner, and the transient response is rather stable.

Figure 8:
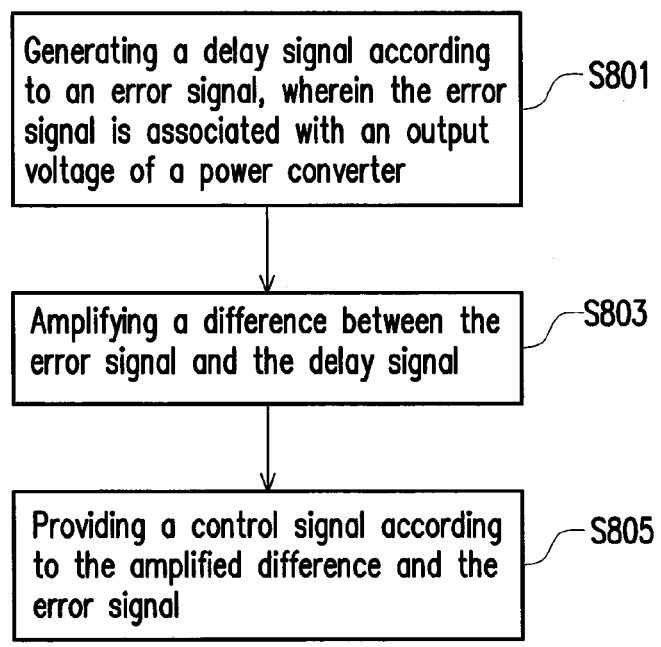
FIG. 8 is a flowchart illustrating a control method of a power converter according to an embodiment of the invention.

A control method of a common power converter may be derived from the previous embodiments, which is described hereinafter. Specifically, FIG. 8 is a flowchart illustrating a control method of a power converter according to an embodiment of the invention. With reference to FIG. 3 and FIG. 8, the control method in the present embodiment may include following steps.

In step S801, a delay signal Verr_delay is generated according to an error signal Verr, and the error signal Verr is associated with an output voltage Vout of a power converter 300.

In step S803, a difference between the error signal Verr and the delay signal Verr_delay is amplified.

In step S805, a control signal Vnew_err is provided according to the amplified difference and the error signal Verr. Note that a phase of the control signal Vnew_err leads a phase of the error signal Verr.

To sum up, in the power converter, the phase adjustment circuit of the power converter, and the control method of the power converter, the error signal is converted into a new control signal through the phase-lead mechanism, and the control signal replaces the error signal. During the loop control, the control signal may contribute to phase compensation; hence, the output voltage of the power converter may be converged in a rapid manner, and the transient response is rather stable. In another aspect, the phase adjustment circuit of the power converter may be applied to a conventional COT structure.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

Any of the embodiments or any of the claims of the invention does not need to achieve all of the advantages or features disclosed by the invention. Moreover, the abstract and the headings are merely used to aid in searches of patent files and are not intended to limit the scope of the claims of the invention.

What is claimed is:

1. A phase adjustment circuit of a power converter, the phase adjustment circuit performing delay processing on an error signal to generate a delay signal, amplifying a difference between the error signal and the delay signal, and adding the amplified difference and the error signal to provide a control signal, wherein the error signal is associated with an output voltage of the power converter.

2. The phase adjustment circuit as recited in claim 1, further comprising:
    a first amplifier, a first input terminal of the first amplifier receiving the error signal;
    a first resistor, a first terminal of the first resistor being coupled to a second input terminal and an output terminal of the first amplifier;
    a first capacitor coupled between a second terminal of the first resistor and a ground terminal; and
    a voltage control voltage source, a first input terminal of the voltage control voltage source being coupled to the first terminal of the first resistor, a second input terminal of the voltage control voltage source being coupled to the second terminal of the first resistor, a first output terminal of the voltage control voltage source outputting the control signal, a second output terminal of the voltage control voltage source being coupled to the first input terminal of the first amplifier.

3. The phase adjustment circuit as recited in claim 1, further comprising:
    a second amplifier, a first input terminal of the second amplifier receiving the error signal, an output terminal of the second amplifier outputting the control signal;
    a second resistor coupled between a second input terminal and the output terminal of the second amplifier; and
    a second capacitor coupled between the second input terminal of the second amplifier and a ground terminal.

4. The phase adjustment circuit as recited in claim 1, further comprising:
    a current source;
    a first current mirror coupled between an operating voltage and the current source;
    a first p-type metal oxide semiconductor transistor, a source of the first p-type metal oxide semiconductor transistor being coupled to the first current mirror, a gate of the first p-type metal oxide semiconductor transistor receiving the error signal;
    a third capacitor, a first terminal of the third capacitor being coupled to the operating voltage, a second terminal of the third capacitor being coupled to the source of the first p-type metal oxide semiconductor transistor;
    a first n-type metal oxide semiconductor transistor, a gate of the first n-type metal oxide semiconductor transistor being coupled to the gate of the first p-type metal oxide semiconductor transistor;
    a third resistor, a first terminal of the third resistor being coupled to the source of the first n-type metal oxide semiconductor transistor; and
    a second current mirror coupled to a drain of the first p-type metal oxide semiconductor transistor, a second terminal of the third resistor, and a ground terminal, wherein the control signal is generated at a region where the second current mirror and the third resistor are coupled to each other.

5. The phase adjustment circuit as recited in claim 1, wherein a phase of the control signal leads a phase of the error signal.

6. A power converter comprising:
    a first amplifier, a first input terminal of the first amplifier receiving a reference voltage, a second input terminal of the first amplifier receiving a feedback signal, an output terminal of the first amplifier outputting an error signal, wherein the feedback signal is associated with an output voltage of the power converter;

a phase adjustment circuit coupled to the first amplifier, the phase adjustment circuit performing delay processing on the error signal to generate a delay signal, amplifying a difference between the error signal and the delay signal, and adding the amplified difference and the error signal to provide a control signal;

a comparator, a first input terminal of the comparator receiving the control signal, a second input terminal of the comparator receiving a ramp signal, an output terminal of the comparator outputting a comparison signal; and a control circuit generating a pulse width modulation signal according to the comparison signal, so as to control the power converter.

7. The power converter as recited in claim 6, wherein the phase adjustment circuit comprises:

a second amplifier, a first input terminal of the second amplifier receiving the error signal;

a first resistor, a first terminal of the first resistor being coupled to a second input terminal and an output terminal of the second amplifier;

a first capacitor coupled between a second terminal of the first resistor and a ground terminal; and a voltage control voltage source, a first input terminal of the voltage control voltage source being coupled to the first terminal of the first resistor, a second input terminal of the voltage control voltage source being coupled to the second terminal of the first resistor, a first output terminal of the voltage control voltage source outputting the control signal, a second output terminal of the voltage control voltage source being coupled to the first input terminal of the second amplifier.

8. The power converter as recited in claim 6, wherein the phase adjustment circuit comprises:

a third amplifier, a first input terminal of the third amplifier receiving the error signal, a second resistor being coupled between a second input terminal and an output terminal of the third amplifier, the output terminal of the third amplifier outputting the control signal; and a second capacitor coupled between the second input terminal of the third amplifier and a ground terminal.

9. The power converter as recited in claim 6, wherein a phase of the control signal leads a phase of the error signal.

10. A control method of a power converter, the control method comprising:

performing delay processing on an error signal to generate a delay signal, wherein the error signal is associated with an output voltage of the power converter;

amplifying a difference between the error signal and the delay signal; and adding the amplified difference and the error signal to provide a control signal.

11. The control method as recited in claim 10, wherein a phase of the control signal leads a phase of the error signal.

* * * * *